United States Patent
Kong

(10) Patent No.: US 6,896,956 B2
(45) Date of Patent: May 24, 2005

(54) SEALABLE AND PEELABLE FILM STRUCTURE

(75) Inventor: Dan-Cheng Kong, Fairport, NY (US)

(73) Assignee: ExxonMobil Oil Corporation, Irving, TX (US)

(*) Notice: Subject to any disclaimer, the term of this patent is extended or adjusted under 35 U.S.C. 154(b) by 47 days.

(21) Appl. No.: 10/319,202

(22) Filed: Dec. 13, 2002

(65) Prior Publication Data

US 2004/0115458 A1 Jun. 17, 2004

(51) Int. Cl.[7] .......................... B32B 7/06; B32B 27/32
(52) U.S. Cl. ................... 428/317.9; 428/215; 428/461; 428/349; 428/516; 428/518; 428/520; 428/354; 428/213; 428/318.4
(58) Field of Search .............................. 428/516, 317.9, 428/318.4, 349, 213, 215, 461, 518, 520, 354

(56) References Cited

U.S. PATENT DOCUMENTS

| | | | |
|---|---|---|---|
| 4,361,237 A | 11/1982 | Heiremans et al. | |
| 4,367,312 A | 1/1983 | Bontinck et al. | |
| 4,377,616 A | 3/1983 | Ashcraft et al. | |
| 4,632,869 A | 12/1986 | Park et al. | |
| 4,666,778 A | 5/1987 | Hwo | |
| 5,023,121 A | 6/1991 | Pockat et al. | |
| 5,254,394 A | 10/1993 | Bothe et al. | |
| 5,358,792 A | 10/1994 | Mehta et al. | |
| 5,443,915 A | 8/1995 | Wilkie et al. | |
| 5,482,780 A | 1/1996 | Wilkie et al. | |
| 5,500,265 A | 3/1996 | Ambroise et al. | |
| 5,716,698 A | 2/1998 | Schreck et al. | |
| 5,773,136 A * | 6/1998 | Alder et al. | 428/317.3 |
| 5,888,648 A | 3/1999 | Donovan et al. | |
| 5,997,968 A | 12/1999 | Dries et al. | |
| 6,231,975 B1 | 5/2001 | Kong et al. | |
| 6,248,442 B1 | 6/2001 | Kong et al. | |
| 2002/0013415 A1 * | 1/2002 | Mechelaere et al. | 525/191 |
| 2003/0134159 A1 | 7/2003 | Peet | |

FOREIGN PATENT DOCUMENTS

WO   WO96/04178   2/1996

* cited by examiner

*Primary Examiner*—D. Lawerence Tarazano
(74) *Attorney, Agent, or Firm*—Rick F. James

(57) ABSTRACT

An opaque, sealable and peelable film, including at least (a) a cavitated first core layer containing a thermoplastic polymer and a cavitating agent, (b) a second core layer containing a peelable blend and (c) one or more outer layers, at least one of which is a sealable outer layer, each independently containing a thermoplastic polymer. The peelable blend of the second core layer (b) may contain (i) from 20–80 wt % of a polyethylene and (ii) from 80–20 wt % of a polyolefin incompatible with polyethylene (i), or it may contain (i) from 10–35 wt % of ethylene-α-olefin elastomer and (ii) from 90–65 wt % of propylene homopolymer.

19 Claims, No Drawings

SEALABLE AND PEELABLE FILM STRUCTURE

BACKGROUND OF THE INVENTION

The invention relates to thermoplastic film structures that are sealable and peelable, and to methods of manufacturing the same.

A peelable film structure is described in publication WO 96/04178. The film structure comprises (a) a core layer comprising an olefin polymer and (b) a heat-sealable layer comprising a blend of low density polyethylene (LDPE) and a material incompatible with the LDPE, such as an olefin polymer or a co- or terpolymer of ethylene, propylene or butene. The film structure can be heat-sealed to a plastic container to form the lid of the container, or to itself to form a package. It is disclosed that when used with a plastic container, the film structure can be readily peeled from the container in order to open it.

U.S. Pat. No. 5,358,792 discloses a heat-sealable composition comprising (a) from about 30 to about 70 wt % of a low-melting polymer comprising a very low density ethylene-based copolymer defined by a density in the range of about 0.88 g/cm$^3$ to about 0.915 g/cm$^3$, a melt index in the range of about 1.5 dg/min to about 7.5 dg/min, a molecular weight distribution ($M_w/M_n$) no greater than about 3.5 and (b) from about 70 to about 30 wt % of a propylene-based polymer.

U.S. Pat. No. 5,443,915 discloses an oriented, polyolefin film that has a white-opaque cold seal-receptive skin layer on one side of a core layer and a vacuum deposited metal layer on the other side of the core layer. The cold seal-receptive polyolefin layer contains: (a) a slip agent in an amount sufficient to provide not more than about an 0.4 coefficient of friction to the surface of such layer; and (b) from about 10 to 40 wt % of titanium dioxide. The core layer is substantially free of opacifying filler and/or opacifying voids. The other side of the film is metallized to an optical density of at least 1.5, whereby the white pigment in the sealing layer in cooperation with the metallization gives a strong white-opaque appearance to the cold seal receptive layer.

U.S. Pat. No. 5,482,780 discloses an oriented polymeric α-olefin film having: an isotactic propylene homopolymer core; a cold seal release skin layer adherent to one side of the core; and a surface treated cold seal receptive layer or such treated layer with a cold seal cohesive composition over the surface treatment of said layer on the other side of the core. The cold seal release skin layer comprises a slip agent and a blend of two polymers, namely, an ethylene-propylene random copolymer containing about 2% to 8% of ethylene in such copolymer and an ethylene-butylene copolymer containing about 0.5% to 6% of ethylene in such copolymer. The cold seal receptive layer is of an ethylene-propylene random copolymer containing about 2 to 8% of ethylene.

U.S. Pat. No. 5,500,265 discloses a peelable film comprising (a) a core layer comprising an olefin polymer, (b) a skin layer on at least one surface of the core layer, the skin layer comprising: a blend of a butylene polymer with another olefin polymer or a polymer of butylene and at least one other olefin, and (c) a coating layer on the skin layer.

U.S. Pat. No. 5,716,698 relates to a peelable, oriented, opaque, multilayer polyolefin film comprising at least one opaque layer and a peelable top layer. All layers of the film are essentially vacuole-free. The opaque layer contains pigments having a mean particle diameter of from 0.01 to 1 μm.

U.S. Pat. No. 5,997,968 discloses a multilayer polyolefin film comprising at least three coextruded layers comprising an opaque base layer, an intermediate layer, and an outer peelable surface layer composed of two incompatible polyolefins, wherein the intermediate layer contains at least 80% by weight of a polyolefin having a lower melting point or lower glass transition temperature than the polyolefin forming the base layer.

U.S. Pat. No. 6,231,975 discloses a sealable film that comprises: (a) an inner layer comprising an olefin polymer; (b) a sealing layer; and (c) a separable layer positioned between the inner layer and the sealing layer, the separable layer comprising (1) ethylene-propylene block copolymer or (2) a blend of polyethylene and another olefin which is incompatible with the polyethylene, specifically either (i) polypropylene homopolymer or (ii) ethylene-propylene block copolymer.

U.S. Pat. No. 6,248,442 relates to multilayer films that are heat-sealable over a broad temperature range. The '442 patent also relates to multilayer films that provide easy-opening and hermetic seals to packages. The films of the '442 patent are made up of a core layer comprising linear low density polyethylene (LLDPE) and at least one skin layer having a melting point of at least 10° C. below the core layer melting point.

There is still room for improvement, however, in the field of sealable and peelable film structures. In particular, a need still exists for a film structure that maximizes the advantageous combination of (i) a sealable outer layer that seals well to itself or other surfaces over a broad temperature range and (ii) a particular multilayer design that permits (a) separation of the sealed outer layer from at least one other layer of the film and (b) the seal to be readily opened without creating a "z-direction" tear.

A z-direction tear disrupts the integrity of a multilayer film when the film is pulled apart at the seal. A film with a z-direction tear has not simply separated at the seal line. Instead, the separation, or tear, has extended to other layers of the film. It is difficult to properly reclose a package that has a z-direction tear, thereby hampering the ability of the package to maintain the freshness of its contents. When z-direction tears can be eliminated, packages are easily refolded and sealed by simple mechanical means, such as a clip.

SUMMARY OF THE INVENTION

It is an object of the invention to provide a thermoplastic film structure with a sealable outer layer that seals well over a broad temperature range.

It is another object of the invention to provide a thermoplastic film structure with a sealable outer layer that, when sealed, can be readily opened without creating a z-direction tear.

It is a further object of the invention to provide a thermoplastic film structure with multiple layers, including a core layer comprising a peelable, polyolefinic blend and a sealable outer layer that can be sealed to itself or other surfaces, wherein the particular multilayer thermoplastic film structure permits separation of the sealable outer layer from at least one other layer of the film.

It is yet another object of the invention to provide both clear and opaque thermoplastic film structures.

There is provided a sealable and peelable film, including at least (a) a core layer comprising a peelable blend comprising (i) from 20–80 wt % of a polyethylene and (ii) from 80–20 wt % of a polyolefin incompatible with polyethylene (i) and (b) a pair of outer layers, at least one of which is a sealable outer layer, each independently comprising a thermoplastic polymer.

There is also provided a sealable and peelable film, including at least (a) a core layer comprising a peelable blend comprising (i) from 10–35 wt % of an ethylene-α-olefin elastomer and (ii) from 90–65 wt % of a propylene homopolymer and (b) a pair of outer layers, at least one of which is a sealable outer layer, each independently comprising a thermoplastic polymer.

There is also provided an opaque, sealable and peelable film, including at least (a) a cavitated first core layer comprising a thermoplastic polymer and a cavitating agent; (b) a second core layer comprising a peelable blend comprising (i) from 20–80 wt % of a polyethylene and (ii) from 80–20 wt % of a polyolefin incompatible with polyethylene (i); and (c) a pair of outer layers, at least one of which is a sealable outer layer, each independently comprising a thermoplastic polymer.

There is also provided an opaque, sealable and peelable film, including at least (a) a cavitated first core layer comprising a thermoplastic polymer and a cavitating agent; (b) a second core layer comprising a peelable blend comprising (i) from 10–35 wt % of an ethylene-α-olefin elastomer and (ii) from 90–65 wt % of a propylene homopolymer; and (c) a pair of outer layers, at least one of which is a sealable outer layer, each independently comprising a thermoplastic polymer.

Sealable and peelable film structures according to the present invention may also include an intermediate layer comprising a propylene homopolymer, wherein the intermediate layer is positioned between the core layer comprising the peelable, polyolefinic blend and the sealable outer layer.

Once sealed, a sealable film without the present multilayer design is usually torn through, i.e., torn in the z-direction, to open the seal, especially when the area where the film is sealed is stronger than the film as a whole. With the sealable and peelable film structures of this invention, a seal can be opened without tearing the film in the z-direction because the particular multilayer structure of the present films, including a core layer comprising a peelable, polyolefinic blend, permits the seal to be separated without tearing the film in the z-direction.

Thus, a particular advantage of the present sealable and peelable films is that they do not compromise the desired properties of a seal material, such as hot tack and seal strength, because the present sealable outer layer(s) may use ordinary seal materials to seal the film, and yet the films are still peelable.

For example, a sealable and peelable film structure according to the present invention may advantageously possess a peak crimp seal strength between 300 g/in and 800 g/in, e.g., from 450 g/in to 750 g/in, and a ratio of plateau crimp seal strength to peak crimp seal strength of greater than 60% and less than 100%, e.g., greater than 70% and less than 95%. These ranges identify a seal that is both strong and readily peelable.

DETAILED DESCRIPTION OF THE INVENTION

The sealable and peelable film structure includes a core layer comprising a peelable, polyolefinic blend.

In general, the presence of the peelable, polyolefinic blend in a core layer means that there will be a weak bond between the core layer and adjacent layers on either side of the core layer so that stress applied to the film structure after the film structure has been sealed will promote destruction of the core layer and not its adjacent layers. Alternatively, the core layer comprising a peelable, polyolefinic blend may have less cohesive strength than either of its adjacent layers, which causes the core layer to give way before either of its adjacent layers. The term "peelable" is used herein to cover the class of film-forming polyolefinic blends included in the core layer that allow the layers adjacent to the core layer to be separated from the core layer under stress as essentially integral layers.

The peelable polyolefinic blend comprises an ethylene polymer and a polyolefin incompatible with the ethylene polymer. The term "incompatible" is used in the ordinary sense both here and throughout, meaning that the ethylene polymer and the other polyolefin are two distinct phases. The term "ethylene polymer," as used here and throughout, includes ethylene homo-, co- and terpolymers, including, among others, linear ethylene homopolymers, linear ethylene-α-olefin copolymers, and ethylene-α-olefin elastomers. Comonomers of the ethylene copolymers, terpolymers, and elastomers can be $C_3$–$C_{12}$ olefins, preferably $C_4$–$C_{12}$ olefins.

More specifically, the ethylene polymer of the peelable polyolefinic blend may be ethylene-α-olefin block copolymer, ethylene-propylene impact copolymer, high density polyethylene (HDPE), medium density polyethylene (MDPE), low density polyethylene (LDPE), linear low density polyethylene (LLDPE), very low density polyethylene (VLDPE), ethylene plastomer, ethylene-α-olefin elastomer and blends thereof. It will be readily understood that the foregoing list of suitable ethylene polymers is non-exhaustive, and includes both Ziegler-Natta- and single site-catalyzed, e.g., metallocene-catalyzed, versions thereof. In preferred embodiments, the ethylene polymer of the peelable polyolefinic blend is a linear ethylene homo- or copolymer or an ethylene-α-olefin elastomer.

LLDPE has: a melt index of from less than 1 to 10 g/10 min (as measured according to ASTM D1238) and a density in the range of from 0.88 to 0.94 g/cm$^3$, preferably from 0.89 to 0.92 g/cm$^3$. It may be derived from ethylene together with other higher comonomers, such as butene-1, hexene-1 or octene-1.

HDPE is a substantially linear polyolefin having a density of, for example, from about 0.941 g/cm$^3$ or higher, e.g., from about 0.952 g/cm$^3$ to about 0.970 g/cm$^3$, and a melting point of, for example, from about 266° F. to about 299° F. (from about 130° C. to about 148° C.).

MDPE has a density in the range of from about 0.926 g/cm$^3$ to about 0.940 g/cm$^3$.

LDPE has a density in the range of from 0.90 g/cm$^3$ to 0.94 g/cm$^3$, e.g., from 0.910 g/cm$^3$ to 0.926 g/cm$^3$, and a melt index of from less than 1 to 10 g/10 min (as measured according to ASTM D1238). LDPE may be derived solely from ethylene in a high pressure polymerization. LLDPE is made from ethylene together with a comonomer, including but not limited to higher olefin comonomers containing 4 to 12 carbon atoms, e.g., butene-1, hexene-1, or octene-1, e.g., in a gas phase linear low density polyethylene (LLDPE) process or in a solution LLDPE process using Ziegler-Natta or single-site, e.g., metallocene, catalysts. When LDPE has been polymerized at high pressure, it is typically referred to as high-pressure polyethylene or branch polyethylene.

VLDPE, which is sometimes referred to as ultra low density polyethylene (ULDPE), is a very low density polyethylene that has a density at or below 0.915 g/cm³, e.g., from about 0.86 to about 0.915 g/cm³, a melt index in the range of about 1.5 dg/min to about 7.5 dg/min, and a melting point in the range of about 60° C. to about 115° C., measured as DSC peak $T_m$. VLDPE is typically produced in a high pressure, peroxide-catalyzed reaction or in a solution process. When produced using a metallocene or other single-site catalyst, VLDPE is commonly referred to as a type of plastomer.

Ethylene-propylene impact copolymer may be produced in two reactors. A first reactor generates, e.g., isotactic propylene homopolymer. In a second reactor, ethylene and propylene are polymerized to create an ethylene-propylene elastomer. The isotactic propylene homopolymer of the first reactor may be transferred to the ethylene-propylene elastomer of the second reactor, wherein the ethylene-propylene elastomer is dispersed in the isotactic propylene homopolymer phase at a ratio of from 60–95% by weight of isotactic propylene homopolymer and from 5–40% by weight of ethylene-propylene elastomer, each based on the total weight of the final impact copolymer.

When the peelable polyolefinic blend comprises ethylene-α-olefin block copolymer, the block copolymer comprises from about 3 to about 25 wt % ethylene, based on the total weight of the block copolymer. The term "block" is used in the ordinary sense both here and throughout, meaning a polymer made up of alternating sections of ethylene or polyethylene and sections of a different olefin. For example, in an ethylene-propylene block copolymer, the ethylene or polyethylene sections alternate with propylene or polypropylene sections.

When the peelable polyolefinic blend comprises ethylene-α-olefin elastomer, the elastomer comprises from 50 mol % to 80 mol % ethylene, based on the total moles of the elastomer. The α-olefin of the ethylene-α-olefin elastomer may be a $C_3$ to $C_{12}$ olefin; preferably, the α-olefin is propylene.

In addition, ethylene-α-olefin elastomer may be added as a supplemental component to a core layer comprising a peelable polyolefinic blend in instances where the peelable polyolefinic blend itself does not comprise an ethylene-α-olefin elastomer. For example, a core layer comprising a peelable polyolefinic blend may be supplemented with from about 1 to about 5 wt % of an ethylene-α-olefin elastomer. The addition of from about 1 to about 5 wt % of an ethylene-α-olefin elastomer to a core layer comprising a peelable polyolefinic blend enhances the overall tear resistance of the sealable and peelable film.

Commercially available polyethylenes suitable for the peelable polyolefinic blend include an ethylene-propylene block copolymer sold by Himont as "8523"; a LLDPE sold by Exxon as "LL3001"; a metallocene-catalyzed plastomer ethylene-hexene copolymer sold by Exxon as "SLP 9045"; a HDPE sold by Oxychem as "M6211"; a LDPE sold by Chevron as "PE1019"; a metallocene-catalyzed polyethylene sold by Exxon as "Exact 2009"; a LLDPE sold by Eastman Chemical as "Eastman L72108x"; an ethylene-propylene elastomer that has 60 mol % ethylene sold by Exxon as "Exxelor PE901"; and a LLDPE sold by Dow Chemical as "Dowlex 2038."

Although any polyolefin incompatible with polyethylene may be chosen for the peelable polyolefinic blend, in a preferred embodiment, a propylene polymer is employed, and in a particularly preferred embodiment, a propylene homopolymer is employed. The term "propylene polymer," as used here and throughout, includes propylene homo-, co-and terpolymers. The particularly preferred propylene homopolymer may be predominantly isotactic, syndiotactic or atactic, and may include a blend of any of the foregoing forms of propylene homopolymer. The propylene homopolymer may be produced by using Ziegler-Natta or single site, e.g., metallocene, catalysts.

For example, the particularly preferred propylene homopolymer may be an isotactic propylene homopolymer having (i) an isotacticity of from about 85 to 99%, (ii) a melting point of from about 311° F. (155° C.) to about 329° F. (165° C.), and (iii) a melt flow rate of from about 0.5 to about 15 g/10 minutes (as measured according to ASTM D1238).

Propylene homopolymers available developmentally or commercially and suitable for the peelable polyolefinic blend include metallocene-catalyzed propylene homopolymers, such as EOD 96-21 and EOD 97-09, from Fina Oil and Chemical Co., EXPP-129, from ExxonMobil Chemical Co., Novalen M, from BASF GmbH., and Ziegler-Natta-catalyzed propylene homopolymers, such as "Fina 3371" sold by Fina Oil and Chemical Company.

The respective amounts present in the peelable polyolefinic blend of (i) ethylene polymer and (ii) polyolefin incompatible with the ethylene polymer may vary over a wide range. For example, the peelable polyolefinic blend may comprise from about 20 to about 80 wt % of (i) ethylene polymer and from about 80 to about 20 wt % of (ii) incompatible polyolefin, each based on the total weight of the peelable polyolefinic blend. In a preferred embodiment, the peelable polyolefinic blend comprises from about 20 to about 40 wt % of (i) ethylene polymer and from about 80 to about 60 wt % of (ii) incompatible polyolefin, each based on the total weight of the peelable polyolefinic blend.

In the particular case where the ethylene polymer (i) of the peelable polyolefinic blend is an ethylene-α-olefin elastomer, the peelable polyolefinic blend may comprise from about 10 to about 35 wt % of ethylene-α-olefin elastomer and from about 90 to about 65 wt % of propylene homopolymer. Preferably, the peelable polyolefinic blend comprises from about 10 to about 20 wt % of ethylene-α-olefin elastomer and from about 90 to about 80 wt % of propylene homopolymer.

The sealable and peelable film structure may be clear or opaque.

The thickness of the core layer comprising a peelable, polyolefinic blend may be important in some embodiments. For example, the polyolefinic blend-containing core layer of a clear film structure is preferably from 7.5 to 70 μm thick, with a total film thickness ranging from 11 to 100 μm, e.g., from 11 to 75 μm thick. On the other hand, the polyolefinic blend-containing core layer of an opaque film structure is preferably from 7.5 to 15 μm thick, with a cavitated core layer preferably from 7.5 to 55 μm thick, a total two core layer thickness of preferably from 15 to 70 μm, and a total film thickness of from 17.5 to 100 μm, e.g., from 17.5 to 75 μm thick.

For clear embodiments, the layers of the sealable and peelable film structure, including the core layer comprising a peelable polyolefinic blend described in detail above, and other layers of the film structure yet to be described in detail, are devoid of any cavitating agent or opacifying agent. In addition, the respective amounts of (i) ethylene polymer and (ii) polyolefin incompatible with the ethylene polymer present in the peelable polyolefinic blend may be specifically selected to meet optimal optical clarity objectives through routine experimentation.

For opaque embodiments, a cavitating agent and/or an opacifying agent may be added to any one or more of the layers of the film structure. In preferred opaque embodiments, however, the core layer comprising a peelable polyolefinic blend is devoid of any cavitating agent or opacifying agent, and the sealable and peelable film structure derives its opacity from one or more cavitated core layers. For example, in a preferred opaque embodiment, the sealable and peelable film structure may comprise a cavitated first core layer and a non-cavitated second core layer comprising the peelable polyolefinic blend, i.e., the core layer previously described in detail.

A cavitated core layer according to the invention comprises a film-forming, thermoplastic polymer. The film-forming, thermoplastic polymer of the cavitated core layer is not particularly limited, and may include any such polymer known in the art, or any such blend of polymers. Preferably, the thermoplastic polymer comprises a film-forming polyolefin, be it either Ziegler-Natta- or single site-catalyzed. Most preferably, the thermoplastic polymer comprises a film-forming ethylene polymer or propylene polymer.

In general, if the thermoplastic polymer is a propylene polymer, it is predominantly isotactic, syndiotactic or atactic. The propylene polymer, however, may comprise greater than about 80 wt % of isotactic polypropylene, based on the entire weight of the propylene polymer, or greater than about 80 wt % of syndiotactic polypropylene, based on the entire weight of the propylene polymer. As a particular example, the thermoplastic polymer of the cavitated core layer may comprise an isotactic propylene homopolymer that has (i) an isotacticity of from about 85 to 99%, (ii) a melting point of from about 311° F. (155° C.) to about 329° F. (165° C.), and (iii) a melt flow rate of from about 0.5 to about 15 g/10 minutes (as measured according to ASTM D1238). On the other hand, if the thermoplastic polymer of the cavitated core layer is an ethylene polymer, it will typically be high density polyethylene (HDPE).

A cavitated core layer according to the invention also comprises a cavitating agent(s) dispersed within the film-forming thermoplastic polymer before extrusion and orientation. A suitable cavitating agent(s) includes any organic or inorganic material that is incompatible with, and has a higher melting point than, the film-forming thermoplastic polymer of the cavitated core layer, at least at the orientation temperature.

For example, the cavitating agent(s) may be any of those described in U.S. Pat. Nos. 4,377,616 and 4,632,869, the entire disclosures of which are incorporated herein by reference. Specific examples of the cavitating agent(s) include polybutyleneterephthalate (PBT), nylon, ethylene-norborene, cyclic olefin copolymer, syndiotactic polystyrene, syndiotactic polystyrene copolymer, a solid preformed glass sphere, a hollow preformed glass sphere, a metal bead, a metal sphere, a ceramic sphere, calcium carbonate ($CaCO_3$), and combinations thereof. When a cavitated core layer comprising a cavitating agent(s) is subjected to uniaxial or biaxial orientation, a cavity forms, providing a film having an opaque appearance.

Suitable cavitating agents for the invention may be available commercially. For example, PBT1300A, available from Ticona, is a polybutyleneterephthalate (PBT). When mixed with molten polypropylene, e.g., Fina 3371 propylene homopolymer, it forms particles of a spherical shape that have a mean particle size of from 1 to 3 μm. 6080HD, available from Schulman, is a masterbatch of high density polyethylene (HDPE) and calcium carbonate ($CaCO_3$). 6080HD is 60 wt % $CaCO_3$ and 40 wt % HDPE.

In general, the particle size of the cavitating agent(s) may be, for example, from about 0.1 micron to about 10 microns, more preferably from about 0.2 micron to about 2 microns. The cavitating agent(s) may also be of any desired shape. For example, the cavitating agent(s) may be substantially spherical. The cavitating agent(s) may be present in the cavitated core layer in an amount of less than 30 wt %, for example from 2 wt % to 20 wt %, e.g., from 5 wt % to 10 wt %, based on the total weight of the cavitated core layer.

The cavitating agent(s) may be dispersed within the film-forming thermoplastic polymer by blending the cavitating agent(s) and the thermoplastic polymer at a temperature above the melting point of the thermoplastic polymer. The blending may take place in, e.g., an extruder, including a single-screw extruder and a co-rotating, intermeshing twin screw extruder.

The cavitated core layer may also comprise an opacifying agent. Examples of the opacifying agent include iron oxide, carbon black, titanium dioxide, talc, and combinations thereof. The opacifying agent may be present in the cavitated core layer in an amount of from 1 to 25 wt %, for example from 1 to 8 wt %, e.g., from about 2 to about 4 wt %, based on the total weight of the cavitated core layer. Aluminum is another example of an opacifying agent that may be used. Aluminum may be included in the cavitated core layer as an opacifying agent in an amount of from 0.01 to 1.0 wt %, e.g. from about 0.25 to about 0.85 wt %, based on the total weight of the cavitated core layer.

The sealable and peelable film structure comprises a pair of outer layers. At least one of the outer layers is a sealable outer layer.

In general, the sealable outer layer comprises a coextrudable or extrusion-coatable material that forms a seal, either with itself or to other surfaces, upon application of elevated temperatures and, at least slight, pressure. Examples of thermoplastic materials which can be used for the sealable outer layer include olefinic homo-, co- and terpolymers. The olefinic monomers can comprise 2 to 8 carbon atoms.

Specific examples of thermoplastic materials suitable for the sealable outer layer include ethylene-propylene random copolymer, ethylene-butene-1 copolymer, ethylene-propylene-butene-1 terpolymer, propylene-butene copolymer, low density polyethylene (LDPE) or high-pressure polyethylene, linear low density polyethylene (LLDPE), very low density polyethylene (VLDPE), single-site metallocene-catalyzed ethylene copolymer, including single-site metallocene-catalyzed ethylene-hexene copolymer, single-site metallocene-catalyzed ethylene-butene copolymer, and single-site metallocene-catalyzed ethylene-octene copolymer, single-site metallocene-catalyzed polymer known by the term plastomer, ethylene-methacrylic acid copolymer, ethylene-vinyl acetate copolymer, and ionomer resin. A blend of any two or more of the foregoing thermoplastic materials is also contemplated, such as a blend of the plastomer and ethylene-butene copolymer.

As mentioned, one outer layer may be a sealable outer layer, or both outer layers may be sealable outer layers. In the case where both outer layers are sealable outer layers, the materials employed in each outer layer may be the same or different. In the case where only one outer layer is a sealable outer layer, the other outer layer, i.e., the non-sealable outer layer, may comprise a film-forming, thermoplastic polymer.

The film-forming, thermoplastic polymer of the non-sealable outer layer is not particularly limited, and may include any such polymer known in the art, or any such blend of polymers. Preferably, the thermoplastic polymer comprises a film-forming polyolefin, be it either Ziegler-Natta- or single-site metallocene-catalyzed. Most preferably, the thermoplastic polymer comprises a film-forming ethylene polymer or propylene polymer. For example, the thermoplastic polymer of the non-sealable outer layer may comprise an isotactic propylene homopolymer, a propylene copolymer or high density polyethylene (HDPE).

To broadly summarize the invention as described thus far, there are provided clear, sealable and peelable film structure embodiments and opaque, sealable and peelable film structure embodiments. In the clear embodiments, the film structure comprises a core layer comprising a peelable, polyolefinic blend and a pair of outer layers. In the opaque embodiments, the film structure preferably comprises a non-cavitated core layer comprising a peelable, polyolefinic blend, one or more cavitated core layers, and a pair of outer layers. For both the clear and opaque embodiments, at least one of the outer layers is a sealable outer layer The individual layers in the opaque embodiments are preferably arranged in a manner such that the core layer comprising a peelable, polyolefinic blend is positioned between the sealable outer layer and the one or more cavitated core layers.

Whether clear or opaque, sealable and peelable film structures according to the invention may additionally comprise one or more intermediate layers. For example, a clear, sealable and peelable film structure may be prepared that has one or more intermediate layers positioned (i) between the core layer and a first outer layer and/or (ii) between the core layer and a second outer layer. Likewise, an opaque, sealable and peelable film structure may be prepared that has one or more intermediate layers positioned (i) between a core layer and a first outer layer and/or (ii) between a core layer and a second outer layer and/or (iii) between the core layer comprising a peelable polyolefinic blend and the one or more cavitated core layers and/or (iv) between two cavitated core layers for embodiments where there is more than one cavitated core layer.

Although the presence of one or more intermediate layers in opaque embodiments may mean that the core layer comprising a peelable, polyolefinic blend is no longer positioned directly between, i.e., directly adjacent to, the sealable outer layer and the one or more cavitated core layers, it will be readily understood that the core layer comprising a peelable, polyolefinic blend is still preferably positioned, in a general sense, i.e., indirectly, between the sealable outer layer and the one or more cavitated core layers.

An intermediate layer according to the invention comprises a film-forming, thermoplastic polymer. The film-forming, thermoplastic polymer of the intermediate layer is not particularly limited, and may include any such polymer known in the art, or any such blend of polymers. Preferably, the thermoplastic polymer comprises a film-forming polyolefin, be it either Ziegler-Natta- or single-site metallocene-catalyzed. Most preferably, the thermoplastic polymer comprises a film-forming ethylene polymer or propylene polymer.

In general, if the thermoplastic polymer is a propylene polymer, it is predominantly isotactic, syndiotactic or atactic. The propylene polymer, however, may comprise greater than about 80 wt % of isotactic polypropylene, based on the entire weight of the propylene polymer, or greater than about 80 wt % of syndiotactic polypropylene, based on the entire weight of the propylene polymer. As a particular example, the thermoplastic polymer of the intermediate layer may comprise an isotactic propylene homopolymer that has (i) an isotacticity of from about 89 to 99%, (ii) a melting point of from about 311° F. (155° C.) to about 329° F. (165° C.), and (iii) a melt flow rate of from about 0.5 to about 15 g/10 minutes (as measured according to ASTM D1238). On the other hand, if the thermoplastic polymer of the intermediate layer is an ethylene polymer, it will typically be high density polyethylene (HDPE).

According to a particularly preferred embodiment, a clear, sealable and peelable film structure comprises an intermediate layer comprising a propylene homopolymer between the core layer comprising a peelable, polyolefinic blend and the sealable outer layer. The inventors have found that positioning an intermediate layer comprising a propylene homopolymer between the core layer and sealable outer layer maximizes the peelability of the layer(s) on the side of the core layer opposite the sealable outer layer from the sealable outer layer without substantially destroying either the layer(s) or the sealable outer layer.

Although it is not preferred, an intermediate layer comprising a propylene homopolymer may also be positioned between the core layer comprising the peelable, polyolefinic blend and the sealable outer layer in opaque embodiments of the invention.

The thickness of an intermediate layer may be important in some embodiments. For example, the thickness of an intermediate layer positioned between a core layer comprising a peelable, polyolefinic blend and a sealable outer layer is preferably from 1 to 3 $\mu$m in both clear and opaque embodiments. In this regard, an intermediate layer positioned between a core layer comprising a peelable, polyolefinic blend and a sealable outer layer may improve the optical gloss and clarity of a clear film and the optical gloss of an opaque film. If the intermediate layer in these applications is greater than 3 $\mu$m, the peel-separation surface of the sample after the peel test is not clean, i.e., some fiber tails are present, even if it is still a peelable seal. If the intermediate layer thickness is below 1 $\mu$m in these applications is less than 1 $\mu$m, the optical property improvement is not effective due to film processing difficulty.

In order to modify or enhance certain properties of the sealable and peelable film structure for specific end uses, it is possible for one or more of the layers to contain appropriate additives in effective amounts. The term "effective amount," as used herein and throughout, is an amount sufficient to achieve the desired effect, e.g., an antiblocking effect for antiblock additives or an antistatic effect for antistatic additives. Examples of suitable additives may include, but are not limited to, waxes, pigments, colorants, antioxidants, antiozonants, antifogs, antistats, slip additives, antiblock additives, fillers such as diatomaceous earth and carbon black, and combinations thereof.

One or more barrier additives may be employed in one or more of the layers of the invention. Suitable barrier additives include, but are not limited to, low molecular weight resins, such as hydrocarbon resins, and more particularly, petroleum resins, styrene resins, cyclopentadiene resins, terpene resins, and alicyclic resins. These types of barrier additives are further described in U.S. Pat. No. 5,254,394, which is incorporated herein by reference.

Typically, a commercially available intensive mixer, such as those of the Boiling- or Banbury-type, may be employed in mixing a concentrate of the additive material and the polymer(s) of the selected layer until there is a uniform dispersion of the additive material in the polymer or polymer blend.

The sealable and peelable film structure may be surface-treated on the outer surfaces of one or both outer layers. The outer surface(s) may be surface-treated during or after orientation. The surface treatment can be carried out by any method, including, but not limited to, corona discharge treatment, flame treatment, and plasma treatment. The outer surface(s) may be treated to a surface tension level of at least about 35 dynes/cm, e.g. from about 38 to 55 dynes/cm, in accordance with ASTM Standard D2578–84.

As described earlier, at least one of the outer layers of the sealable and peelable film structure is a sealable outer layer. In certain embodiments, one outer layer will be a sealable outer layer and a second outer layer is metallized via the application thereto of a thin layer of metal.

The metallization may be by vacuum deposition, or any other metallization technique, such as electroplating or sputtering. The metal may be aluminum, or any other metal capable of being vacuum deposited, electroplated, or sputtered, such as, for example, gold, zinc, copper, or silver.

Typically, a metal layer is applied to an optical density of from 1.5 to 5.0, e.g., from 1.8 to 2.6. Optical density is a measure of the absorption of visual light, and is determined by standard techniques. To calculate optical density, a commercial densitometer may be used, such as a Macbeth model TD 932, Tobias Densitometer model TDX or Macbeth model TD903. The densitometer is set to zero with no film specimen. A film specimen is placed over the aperture plate of the densitometer with the test surface facing upwards. The probe arm is pressed down and the resulting optical density value is recorded.

The sealable and peelable film structure may have a coating layer applied to the outer surfaces of one or both of its outer layers. For example, a coating may be applied to the sealable outer layer to facilitate sealing of the film to itself or to another film surface. Preferably, any coating applied onto the outer surface of a metallized outer layer is applied after the outer surface has been metallized, i.e., the coating is actually applied onto the metal layer that has been deposited on the outer layer. Examples of suitable coatings include, but are not limited to, ethylene-acrylic acid copolymer (EAA), ethylene-methacrylic acid copolymer (EMA), alkyl acrylate copolymer, acrylonitrile, polyvinylidene chloride (PVdC), polyvinyl alcohol (PVOH), and urethane copolymer.

The sealable and peelable film structure may be manufactured using film technology that is well-known to those skilled in the art. For example, melts corresponding to the individual layers of the film structure may be prepared. The melts may be cast-extruded or coextruded into a sheet using a flat die or blown-extruded or coextruded using a tubular die. The sheets may then be oriented either uniaxially or biaxially by known stretching techniques.

In a particular embodiment, the outer layers are coextruded with the other layers of the film structure. In another embodiment, only one of the outer layers is coextruded with the other layers of the film structure. The other outer layer is extrusion-coated onto an outer surface of the film structure. In yet another embodiment, each outer layer is extrusion-coated onto a respective outer surface of the film structure. Regarding extrusion-coating, it may be performed after the film has been oriented or in the middle of the orientation process. For example, after orienting a coextruded sheet in the machine direction, an outer layer may be extrusion-coated onto an outer surface thereof, followed by transverse direction orientation.

The following examples illustrate the present invention. For each example, a coextruded, biaxially oriented film was prepared using the respective olefinic polymer resins described below. Specifically, the particular polymer resins were melted at a temperature ranging from about 245 to about 290° C., the molten polymers were coextruded through a slot die in sheet form, and the coextruded sheet was oriented (sequentially) in the machine direction (about 3 to about 8 times at about 100° C.) and in the transverse direction (about 5 to about 12 times at about 160° C.).

The peelability for each film in Examples 1–9 was tested as follows. The film was sealed by crimp-sealing the seal layer (layer C in Examples 1–3; layer D in Examples 4–9) to itself. Then a tester tried to pull the seal apart. For each of the films in Examples 1–9, the tester was able to separate the seal without severing the film, i.e., without creating a z-direction tear, indicating the effective performance of the peelable film structure.

For the films of Examples 4–9, the film's sealability was tested to confirm that the seal strength of the peelable film structure was not adversely impacted. Specifically, the seal strength for each of the films of Examples 4–9 was evaluated by crimp-sealing the seal layer to itself at 260° F., 20 psi pressure, and ¾ second dwell time. The crimp-sealed sample was cut into 1 inch width and peeled apart at a 180° angle by an Instron Tensile machine at the speed of 0.3 m/min. The peel force versus separation distance was recorded into a chart by a computer, and the peak crimp seal strength and average peel propagation strength, i.e., the plateau crimp seal strength, were measured (as shown in Tables 1 and 2).

EXAMPLE 1

A three-layer clear film with an A/B/C structure was prepared, wherein layer A is a skin layer about 1 $\mu$m thick comprising a propylene homopolymer, layer B is a peelable core layer about 20 $\mu$m thick comprising a blend of 70 wt % propylene homopolymer and 30 wt % metallocene-catalyzed polyethylene, and layer C is a sealable skin layer about 1 $\mu$m thick comprising an ethylene-propylene-butene terpolymer. The film was coextruded and biaxially oriented.

The tester succeeded in pulling apart the seal without creating a z-direction tear, which confirmed that the film was a peelable film.

EXAMPLE 2

A three-layer clear film with an A/B/C structure was prepared, wherein layer A is a skin layer about 1 $\mu$m thick comprising a propylene homopolymer, layer B is a peelable core layer about 20 $\mu$m thick comprising a blend of 70 wt % propylene homopolymer and 30 wt % metallocene catalyzed polyethylene, and layer C is a sealable skin layer about 1 $\mu$m thick comprising a metallocene-catalyzed polyethylene. The film was coextruded and biaxially oriented.

The tester succeeded in pulling apart the seal without creating a z-direction tear, which confirmed that the film was a peelable film.

EXAMPLE 3

A three-layer opaque film with an B1/B2/C structure was prepared, wherein layer B1 is a cavitated core layer about 18 $\mu$m thick comprising 82 wt % of propylene homopolymer and 18 wt % of calcium carbonate ($CaCO_3$), layer B2 is a peelable core layer about 7.5 $\mu$m thick comprising a blend of 70 wt % propylene homopolymer and 30 wt % metallocene-catalyzed polyethylene, and layer C is a sealable skin layer about 1 $\mu$m thick comprising an ethylene-propylene-butene terpolymer. The film was coextruded and biaxially oriented.

The tester succeeded in pulling apart the seal without creating a z-direction tear, which confirmed that the film was a peelable film.

EXAMPLE 4

A four-layer clear film with an A/B/C/D structure was prepared, wherein layer A is a skin layer about 1.75 µm thick comprising Fina 3371 propylene homopolymer, layer B is a peelable core layer about 15 µm thick comprising a blend of 70 wt % Fina 3371 propylene homopolymer and 30 wt % Eastman L72108x linear low density polyethylene (LLDPE), layer C is an intermediate layer about 2.5 µm thick comprising Fina 3371 propylene homopolymer, and layer D is a sealable skin layer about 0.75 µm thick comprising Chisso 7701 ethylene-propylene-butene-1 terpolymer from Chisso Company, Japan. The film was coextruded and biaxially oriented.

The tester succeeded in pulling apart the seal without creating a z-direction tear, which confirmed that the film was a peelable film. The gloss, haze, and seal strength of the film were measured, and the results are presented at Table 1 below.

EXAMPLE 5

A four-layer clear film with an A/B/C/D structure was prepared, wherein layer A is a skin layer about 4.25 µm thick comprising Fina 3371 propylene homopolymer, layer B is a peelable core layer about 15 µm thick comprising a blend of 70 wt % Fina 3371 propylene homopolymer and 30 wt % Eastman L72108x linear low density polyethylene (LLDPE), layer C is an intermediate layer about 2.5 µm thick comprising Fina 3371 propylene homopolymer, and layer D is a sealable skin layer about 0.75 µm thick comprising Chisso 7701 ethylene-propylene-butene-1 terpolymer. The film was coextruded and biaxially oriented.

The tester succeeded in pulling apart the seal without creating a z-direction tear, which confirmed that the film was a peelable film. The gloss, haze, and seal strength of the film were measured, and the results are presented at Table 1 below.

EXAMPLE 6

A four-layer clear film with an A/B/C/D structure was prepared, wherein layer A is a skin layer about 1.75 µm thick comprising Fina 3371 propylene homopolymer, layer B is a peelable core layer about 15 µm thick comprising a blend of 70 wt % Fina 3371 propylene homopolymer and 30 wt % Dowlex 2038 linear low density polyethylene (LLDPE), layer C is an intermediate layer about 2.5 µm thick comprising Fina 3371 propylene homopolymer, and layer D is a sealable skin layer about 0.75 µm thick comprising Chisso 7701 ethylene-propylene-butene-1 terpolymer. The film was coextruded and biaxially oriented.

The tester succeeded in pulling apart the seal without creating a z-direction tear, which confirmed that the film was a peelable film. The gloss, haze, and seal strength of the film were measured, and the results are presented at Table 1 below.

EXAMPLE 7

A four-layer clear film with an A/B/C/D structure was prepared, wherein layer A is a skin layer about 1.25 µm thick comprising Fina 3371 propylene homopolymer, layer B is a peelable core layer about 15 µm thick comprising a blend of 70 wt % Fina 3371 propylene homopolymer and 30 wt % Eastman L72108x linear low density polyethylene (LLDPE), layer C is an intermediate layer about 2.5 µm thick comprising Fina 3371 propylene homopolymer, and layer D is a sealable skin layer about 1.25 µm thick comprising a blend of 30 wt % Chisso 7701 ethylene-propylene-butene-1 terpolymer and 70 wt % Elvax 3128 ethylene-vinyl acetate (EVA). The film was coextruded and biaxially oriented.

The tester succeeded in pulling apart the seal without creating a z-direction tear, which confirmed that the film was a peelable film. The gloss, haze, and seal strength of the film were measured, and the results are presented at Table 1 below.

EXAMPLE 7A

A four-layer clear film with an A/B/C/D structure was prepared, wherein layer A is a skin layer about 1.25 µm thick comprising Fina 3371 propylene homopolymer, layer B is a peelable core layer about 15 µm thick comprising a blend of 90 wt % Fina 3371 propylene homopolymer and 10 wt % Exxon Exxelor PE901 ethylene-propylene elastomer with 60 mol % ethylene, layer C is an intermediate layer about 2 µm thick comprising Fina 3371 propylene homopolymer, and layer D is a sealable skin layer about 1.25 µm thick comprising Chisso 7701 ethylene-propylene-butene-1 terpolymer. The film was coextruded and biaxially oriented.

The tester succeeded in pulling apart the seal without creating a Z-direction tear, which confirmed that the film was a peelable film. The gloss, haze, and seal strength of the film were measured, and the results are presented at Table 1 below.

TABLE 1

PEELABLE, CLEAR FILM DATA

| Ex. | Gloss[1] (%) | Haze[2] (%) | Crimp Seal @ 260° F. | | |
|---|---|---|---|---|---|
| | | | Plateau (g/in) | Peak (g/in) | Plateau/Peak |
| 4 | 89.7 | 1.9 | 423 | 458 | 92% |
| 5 | 89.5 | 1.9 | 432 | 492 | 88% |
| 6 | 90.1 | 1.5 | 433 | 494 | 88% |
| 7 | 68.5 | 5.6 | 363 | 486 | 75% |
| 7A | 84.1 | 3.0 | 574 | 639 | 90% |

[1]-- The gloss of the film was determined in accordance with ASTM D2457 (ExxonMobil 442).
[2]-- The haze of the film was determined in accordance with ASTM D1003 (ExxonMobil 444).

EXAMPLE 8

A four-layer opaque film with an A/B/C/D structure was prepared, wherein layer A is a skin layer about 3.75 µm thick comprising Fina 3371 propylene homopolymer, layer B is a cavitated core layer about 17.5 µm thick comprising 94 wt % Fina 3371 propylene homopolymer and 6 wt % Ticona PBT1300A polybutylene terephthalate (PBT), layer C is a peelable core layer about 7.5 µm thick comprising 70 wt % Fina 3371 propylene homopolymer and 30 wt % Dowlex 2038 linear low density polyethylene (LLDPE), and layer D is a sealable skin layer about 0.75 µm thick comprising Chisso 7701 ethylene-propylene-butene-1 terpolymer. The film was coextruded and biaxially oriented.

The tester succeeded in pulling apart the seal without creating a z-direction tear, which confirmed that the film was a peelable film. The light transmission and seal strength of the film were measured, and the results are presented at Table 2 below.

EXAMPLE 9

A four-layer opaque film with an A/B/C/D structure was prepared, wherein layer A is a skin layer about 3.75 μm thick comprising Fina 3371 propylene homopolymer, layer B is a cavitated core layer about 17.5 μm thick comprising 80 wt % Fina 3371 propylene homopolymer and 20 wt % of Schulman 6080HD calcium carbonate ($CaCO_3$) masterbatch, layer C is a peelable core layer about 7.5 μm thick comprising 70 wt % Fina 3371 propylene homopolymer and 30 wt % Eastman L72108x linear low density polyethylene (LLDPE), and layer D is a sealable skin layer about 0.75 μm thick comprising Chisso 7701 ethylene-propylene-butene-1 terpolymer. The film was coextruded and biaxially oriented.

The tester succeeded in pulling apart the seal without creating a z-direction tear, which confirmed that the film was a peelable film. The light transmission and seal strength of the film were measured, and the results are presented at Table 2 below.

TABLE 2

PEELABLE, OPAQUE FILM DATA

| | | Crimp Seal @ 260° F. | | |
| --- | --- | --- | --- | --- |
| Ex. | Light transmission[1] (%) | Plateau (g/in) | Peak (g/in) | Plateau/Peak |
| 8 | 27.4 | 641 | 737 | 87% |
| 9 | 34.7 | 517 | 584 | 89% |

[1]-- The light transmission of the film was determined according to ASTM D1003 (ExxonMobil 456).

What is claimed is:

1. An oriented, opaque, sealable and peelable film, comprising:
   (a) a non-sealable first outer layer comprising a thermoplastic polymer;
   (b) a cavitated first core layer comprising a thermoplastic polymer and a cavitating agent;
   (c) a second core layer comprising a peelable blend comprising (i) from 20–80 wt % of a polyethylene and (ii) from 80–20 wt % of a polyolefin incompatible with polyethylene (i) of second core layer (c), wherein second core layer (c) is positioned such that cavitated first core layer (b) is between first outer layer (a) and second core layer (c); and
   (d) a sealable second outer layer comprising a thermoplastic polymer, wherein sealable second outer layer (d) is positioned such that second core layer (c) is between cavitated first core layer (b) and sealable second outer layer (d).

2. The film of claim 1, wherein the thermoplastic polymer of cavitated first core layer (b) is propylene homopolymer.

3. The film of claim 1, wherein the cavitating agent of cavitated core layer (b) is selected from the group consisting of polybutyleneterephthalate (PBT), nylon, ethylene-norborene, cyclic olefin copolymer, syndiotactic polystyrene, syndiotactic polystyrene copolymer, a solid preformed glass sphere, a hollow preformed glass sphere, a metal bead, a metal sphere, a ceramic sphere, calcium carbonate ($CaCO_3$), and combinations thereof.

4. The film of claim 1, wherein the polyethylene (i) of second core layer (c) is selected from the group consisting of linear ethylene homopolymer, linear ethylene-α-olefin copolymer, single-site metallocene-catalyzed ethylene homopolymer, single-site metallocene-catalyzed ethylene-α-olefin copolymer, ethylene-α-olefin block copolymer, ethylene-propylene impact copolymer, and blends thereof, and wherein the α-olefin of the linear ethylene-α-olefin copolymer and the α-olefin of the single site-catalyzed ethylene-α-olefin copolymer are independently selected from the group consisting of $C_4$–$C_{12}$ α-olefins.

5. The film of claim 1, wherein the polyethylene (i) of second core layer (c) is ethylene-hexene copolymer.

6. The film of claim 1, wherein the polyethylene (i) of second core layer (c) is ethylene-octene copolymer.

7. The film of claim 1, wherein the polyolefin (ii) incompatible with the polyethylene (i) of second core layer (c) is propylene homopolymer.

8. The film of claim 1, wherein the thermoplastic polymer of sealable second outer layer (d) is selected from the group consisting of ethylene-propylene random copolymer, ethylene-propylene-butene-1 terpolymer, propylene-butene copolymer, low density polyethylene (LDPE), linear ethylene-α-olefin copolymer, single-site metallocene-catalyzed ethylene-α-olefin copolymer, ethylene-methacrylic acid copolymer, ethylene-vinyl acetate copolymer, ionomer, and blends thereof.

9. The film of claim 1, wherein the thermoplastic polymer of non-sealable, first outer layer (a) is propylene homopolymer or propylene copolymer.

10. The film of claim 1, wherein second core layer (c) comprises a peelable blend comprising (i) from 20–40 wt % of a polyethylene selected from the group consisting of high density polyethylene (HDPE), ethylene-butene copolymer, ethylene-pentene copolymer, ethylene-hexene copolymer, ethylene-heptene copolymer, ethylene-octene copolymer, single-site metallocene-catalyzed ethylene homopolymer, single-site metallocene-catalyzed ethylene-hexene copolymer, single-site metallocene-catalyzed ethylene-octene copolymer, single-site metallocene-catalyzed plastomer, ethylene-α-olefin block copolymer, ethylene-propylene impact copolymer, and blends thereof and (ii) from 80–60 wt % of propylene homopolymer.

11. The film of claim 1, wherein cavitated core layer (b) is from 7.5 to 55 μm thick and second core layer (c) is from 7.5 to 15 μm thick.

12. The film of claim 1, wherein an outer surface of non-sealable, first outer layer (a) is surface-treated by a treatment selected from the group consisting of corona discharge treatment, flame treatment, and plasma treatment.

13. The film of claim 1, wherein an outer surface of non-sealable, first outer layer (a) has applied thereon a coating select from the group consisting of ethylene-acrylic acid copolymer (EAA), ethylene-methacrylic acid copolymer (EMA), alkyl acrylate copolymer, acrylonitrile, polyvinylidene chloride (PVdC), polyvinyl alcohol PVOH), and urethane copolymer.

14. The film of claim 1, wherein a metal layer is coated on an outer surface of non-sealable, first outer layer (a) by vacuum metallization.

15. The film of claim 1, wherein the film has a ratio of plateau crimp seal strength to peak crimp seal strength of greater than 60% and less than 100%.

16. The film of claim 1, wherein second core layer (c) comprises from 1 wt % to 5 wt % of an ethylene-α-olefin elastomer as a supplemental component.

17. A method of manufacturing the film of claim 1, comprising the steps of:
   (a) coextruding melts corresponding to the thermoplastic polymer of non-sealable, first outer layer (a), the thermoplastic polymer of first core layer (b) having dispersed therein the cavitating agent, the peelable blend of second core layer (c), and the thermoplastic polymer of sealable second outer layer (d);

(b) quenching the melts to form a coextruded sheet; and (c) biaxially orienting the coextruded sheet to form an opaque, sealable and peelable film.

18. An oriented, opaque, sealable and peelable film, comprising:

(a) a non-sealable, first outer layer comprising a thermoplastic polymer;

(b) a cavitated first core layer comprising a thermoplastic polymer and a cavitating agent;

(c) a second core layer comprising a peelable blend comprising (i) from 10–35 wt % of ethylene-α-olefin elastomer and (ii) from 90–65 wt % of propylene homopolymer, wherein second core layer (c) is positioned such that cavitated first core layer (b) is between first outer layer (a) and second core layer (c); and (d) a sealable second outer layer comprising a thermoplastic polymer, wherein sealable second outer layer (d) is positioned such that second core layer (c) is between cavitated first core layer (b) and sealable second outer layer (d).

19. The film of claim 18, wherein the ethylene-α-olefin elastomer is an ethylene-propylene elastomer, and second core layer (c) comprises a peelable blend comprising (i) from 10–20 wt % of ethylene-propylene elastomer and (ii) from 90–80 wt % of propylene homopolymer.

* * * * *